UNITED STATES PATENT OFFICE.

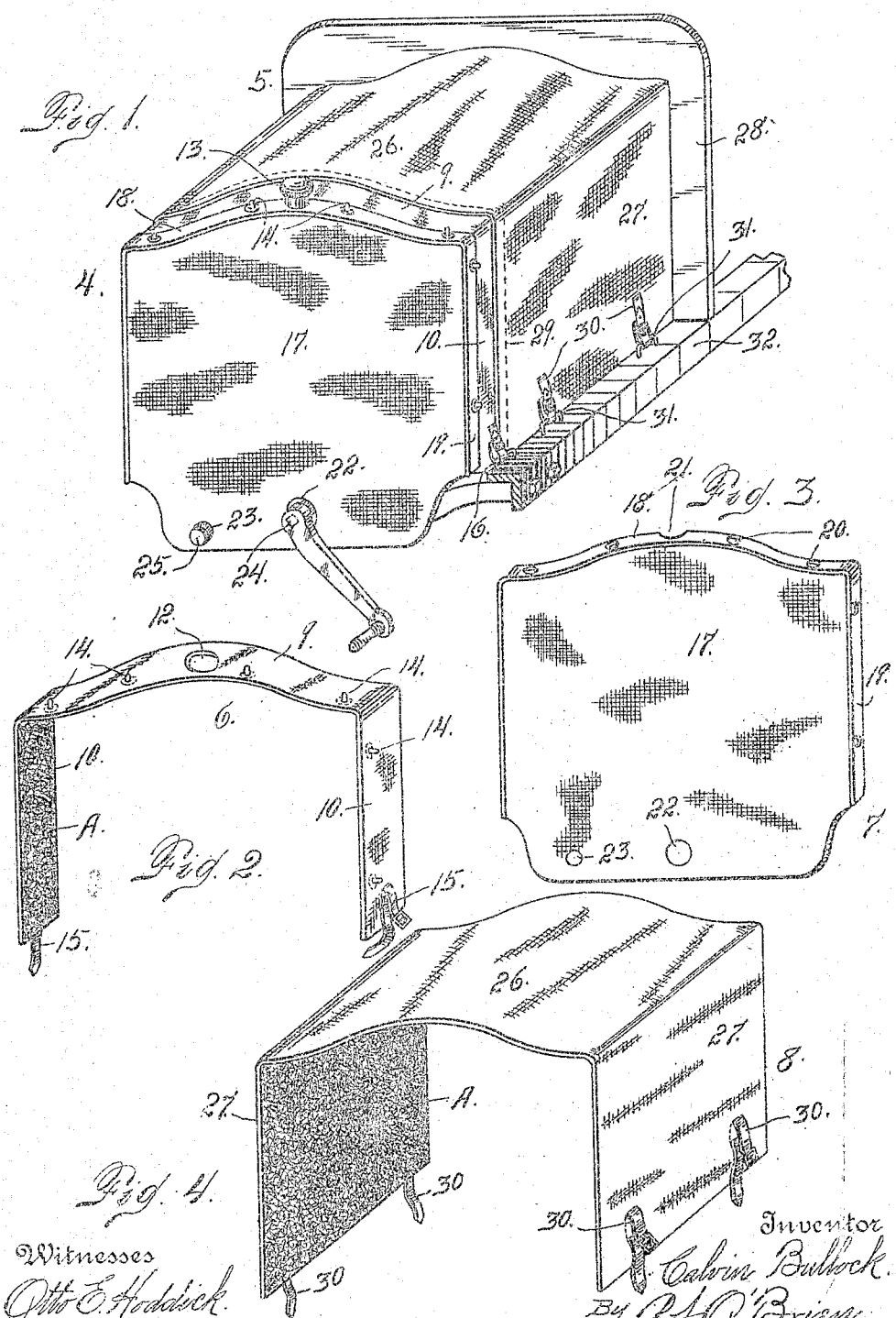

CALVIN BULLOCK, OF DENVER, COLORADO.

COVERING FOR AUTOMOBILE RADIATORS AND HOODS.

1,015,474.   Specification of Letters Patent.   Patented Jan. 23, 1912.

Application filed December 12, 1910. Serial No. 596,938.

*To all whom it may concern:*

Be it known that I, CALVIN BULLOCK, a citizen of the United States, residing in the city and county of Denver and State of Colorado, have invented certain new and useful Improvements in Coverings for Automobile Radiators and Hoods; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for covering the radiators and hoods of automobiles, the object of the invention being more especially the protection of the radiator to prevent the water therein from freezing during cold weather. My improved device is also valuable for the purpose of keeping the engine warm, since if it becomes very cold it is difficult to start the engine, as is well known by those skilled in the art or familiar with the handling of automobile engines.

Heretofore, so far as I am aware, no special covering has been devised for the radiators and hoods of these machines.

In my improved construction I preferably employ a cover consisting of three parts, one of which, namely that directly in contact with the top and sides of the radiator, being permanently attached in cold weather, while the other two parts only need be applied under certain circumstances, as hereinafter more fully explained in detail, reference being made to the accompanying drawing in which is illustrated an embodiment of the invention.

In this drawing: Figure 1 is a perspective view of the radiator and hood of an automobile showing my improved cover applied. Fig. 2 is a perspective view of one section or member of the covering, being that applied to the top and sides of the radiator. Fig. 3 is a similar view of another section of the covering, being that applied to the front end of the radiator. Fig. 4 is a similar view illustrating the portion of the covering adapted to be applied to the hood or housing for the engine.

The same reference characters indicate the same parts in all the views.

Let the numeral 5 designate the hood or housing of an automobile inclosing the engine; and 4 the radiator employed in connection therewith and through which the cooling water from the jackets of the engine cylinders circulates.

As shown in the drawing, my improved covering for the radiator and hood consists of three members designated 6, 7 and 8 respectively. Each of these members is composed of suitable flexible material, having a lining of some suitable substance having a tendency to retard heat radiation in cold weather. This lining is indicated at A in Figs. 2 and 4.

The member 6 consists of a relatively narrow strip of the covering composed of a top part 9 and two depending side members 10. The top part has a centrally located relatively large opening 12 adapted to fit over the tubular projection or spout 13 connected with the top of the radiator; while the lower extremities of the depending members 10 are equipped with straps 15 adapted to be connected with staples or rings 16 attached to the stationary part of the machine.

The member 7 of the covering comprises a main part 17 adapted to cover the exposed end of the radiator, a top flange 18 and side flanges 19. These flanges are provided with openings 20 adapted to receive pins 14 of the member 6, the pins serving to retain the member 7 in position on the radiator and in proper relation with the member 6. The said flanges extend rearwardly at right angles to the body 17 of the member 7, whereby they overlap the member 6. The central portion of the top flange 18 of this member 7 is also recessed as shown at 21, to fit the inlet tube or filler spout for the radiator. The part 17 is also provided with openings 22 and 23 to receive the protruding extremity 24 of the engine shaft and a projection 25 also connected with the engine. The member 8 of the covering is relatively large, since it is adapted to cover the entire hood in the rear of the radiator where the engine is located. This member 8 is composed of a top part 26 and depending side parts 27, these parts being of sufficient length from front to rear to cover the entire hood between the member 6 and the dash 28 located at the rear end of the hood. This member 8 is adapted to overlap the member 6, as indicated by the dotted line 29 in Fig. 1. The depending side portions of this member 8 are equipped with straps 30 for attaching the member to staples or rings 31 connected with a portion 32 of the vehicle frame.

When the device is in use in cold weather, it is preferable to leave the member 6 on the radiator all the time. When, however, the machine is stopped and left for a short time, the member 7 should be applied; while when the machine is left for a considerable time, both members 7 and 8 may be used. The member 8 keeps the engine from getting so cold as to interfere with its proper working.

Having thus described my invention, what I claim is:

A covering for the radiator and hood of an automobile engine, composed of three members, namely, a body member for covering the hood, a relatively narrow strip for covering the radiator at the top and sides, the body member overlapping the relatively narrow strip, and a third cap member for covering the exposed end of the radiator, the narrow strip being equipped with projections and the rim of the cap being provided with perforations adapted to receive the projections of the relatively narrow strip, and suitable means for securing the said members in place on the protected parts.

In testimony whereof I affix my signature in presence of two witnesses.

CALVIN BULLOCK.

Witnesses:-
 S. S. LARGE,
 K. L. MONAHAN.